April 3, 1956 — H. G. MOSHER — 2,740,152

WINDSHIELD WIPER

Filed Feb. 2, 1953

*INVENTOR.*
HARVEY G. MOSHER
BY
Whittemore Hulbert & Belknap
ATTORNEYS

United States Patent Office 2,740,152
Patented Apr. 3, 1956

2,740,152

WINDSHIELD WIPER

Harvey G. Mosher, Taylor Center, Mich.

Application February 2, 1953, Serial No. 334,680

3 Claims. (Cl. 15—255)

The invention relates to windshield wipers of that type in which the wiper blade is carried by a rock-arm, which in turn is secured to a rock-shaft oscillated by any suitable motor mechanism. With such wipers the blade traverses the same path in each oscillation and if there is any imperfection in the wiping edge an unwiped streak may be left upon the glass. It is therefore the object of my invention to obtain a construction in which the blade will traverse a slightly different path in the opposite phases of its oscillation. It is a further object to accomplish this result with a minimum of change in the wiper mechanism.

With these objects in view, the invention consists in the construction as hereinafter set forth.

As illustrated, A is the rock-shaft which may be oscillated by any suitable motor mechanism, not shown. B is an arm secured to the rock-shaft and having attached to its outer end the wiper blade C by the usual pivotal connection D. The blade C has the rigid section C' and the resilient flexible member $C^2$ formed of rubber or similar material which presses the edge thereof against the glass. The construction thus far described is similar to that of windshield wipers in general use and in operation the wiping edge of the member $C^2$ will traverse the same path in both phases of its oscillation.

To effect a change in path I have formed the arm B in two sections B' and $B^2$ which are connected to each other by a hinge E permitting a slight relative angular movement of these sections in the plane of oscillation. The construction of hinge is also such that at one limit of the relative angular movement the said sections are in alignment with each other, while at the other limit they extend in oblique relation. Consequently, when the arm B is moved in one direction the sections B' and $B^2$ will be held in alignment with each other and the radial distance between the axis of the shaft A and the pivotal connection D will be maximum. When, however, the arm B is moved in the opposite direction the friction of the blade upon the glass will hold the same from movement until the lost motion in the hinge E is taken up. Thus, the initial movement of the actuated section B' will carry with it only the connected end of the section $B^2$ while the outer end of said section will be drawn slightly radially inward arranging the section in oblique relation to the section B'. As soon as the lost motion is taken up both sections will move together in this oblique relation to the limit of oscillation of the section B'. At the beginning of the reverse phase in oscillation the section B' will move only the connected end of the section $B^2$ until the lost motion is taken up and both sections are in alignment. This will extend the radial dimension between the axis of the shaft A and the hinge connection D so that the latter will move through a different path in this phase from that which it traversed in the opposite phase. It is, therefore, obvious that the member $C^2$ will be moved radially outward and inward respectively at opposite ends of the oscillation so that the path of the wiping edge of this member will be different in the two phases. Thus, any imperfection in the wiping edge which might leave a streak on the glass during movement in one phase will be shifted in position so that another portion of the edge will traverse this path in the reverse phase and will remove the streak.

Figure 1:
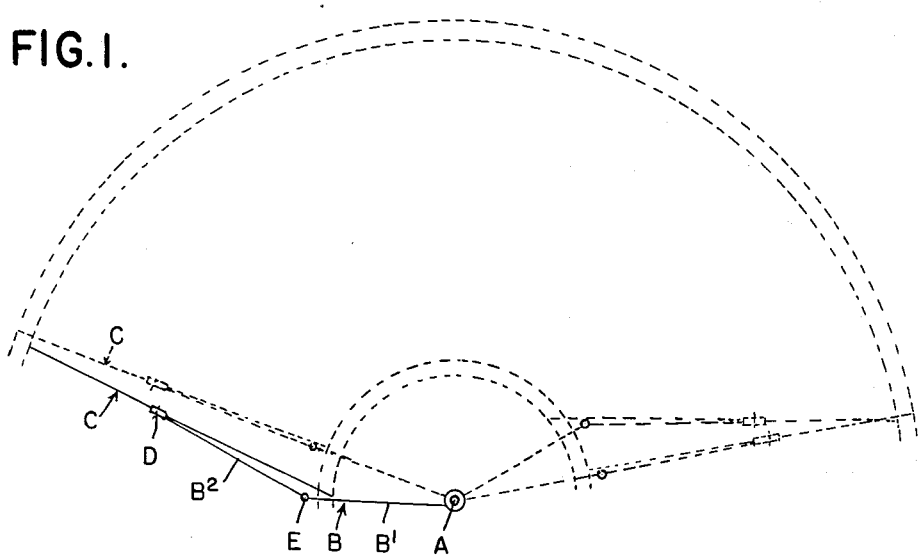
Fig. 1 is a diagram illustrating the construction and operation of my improved windshield wiper.
Figure 2:
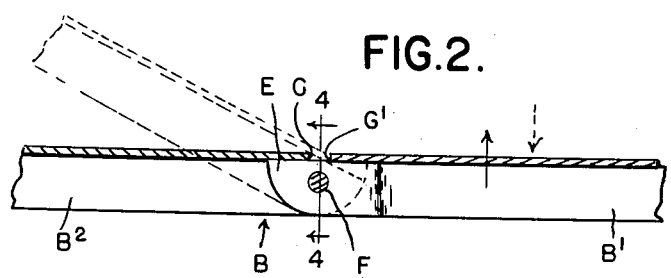
Fig. 2 is a section through the hinge connection between the rock-arm sections.
Figure 3:
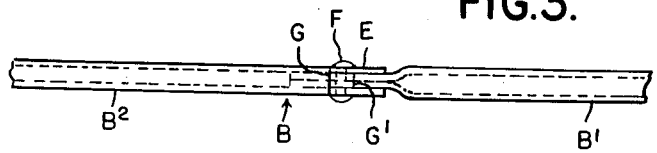
Fig. 3 is an elevation viewed at right angles to Fig. 2.
Figure 4:
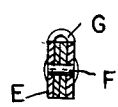
Fig. 4 is a cross-section on line 4—4, Fig. 2.
Figure 5:
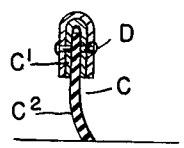
Fig. 5 is a cross-section showing the attachment of the wiper blade to the rock arm.

The hinge connection D may be of any suitable construction permitting the desired amount of lost motion. As shown, the sections B' and $B^2$ of the arm B are each of a U-shaped cross-section. The arm section B' is flattened at its end to be inserted within the U of the section $B^2$ and is pivotally secured thereto by a cross pin F. The connecting portion of the U of each of these members is cut away so as to form shoulders G and G' located on opposite sides of the pivot F. Thus, as shown in Fig. 2, movement of the arm B' in the direction of the full line arrow will carry the section $B^2$ with it and in alignment therewith. On the other hand, movement of the section B' in the direction of the dotted arrow will permit the section $B^2$ to assume an oblique angle with respect to the section B'.

What I claim as my invention is:

1. A windshield wiper comprising a rock-shaft, an arm extending radially from said rock-shaft formed in two sections hinged to each other so as to permit in the plane of movement thereof a limited angular lost motion therebetween with the sections in alignment at one limit and relatively oblique at the other limit, and a wiper blade mounted at the outer end of the outer section of said arm to be carried through one path when said arm is rocked in a direction to hold said sections in alignment and moved bodily radially inward to be carried through a slightly different path when rocked in the opposite direction with said sections in oblique relation to each other.

2. The construction as in claim 1 in which the two sections are each of a U-shaped cross-section with an end portion of one flattened and inserted within an end portion of the other and having a cross pin pivotally connecting the engaged portions, the connecting portion of the U of each section being cut away to form spaced shoulders on opposite sides of the pivot pin which limit the relative angular movement of said sections.

3. The construction as in claim 1 in which all portions of the wiping edge of the wiper blade are moved radially between reverse wiping movements of the wiper so that each portion traverses a different path and any imperfections in one portion which leave the surface traversed thereby in one direction of movement unwiped will be wiped by another portion during movement in the opposite direction.

References Cited in the file of this patent

UNITED STATES PATENTS

| 1,694,245 | Baker | Dec. 4, 1928 |
| 1,695,326 | Folberth | Dec. 18, 1928 |

FOREIGN PATENTS

| 850,273 | Germany | July 24, 1952 |